Apr. 10, 1923.

S. GAVEL ET AL 1,450,954

SHOCK ABSORBER

Filed June 24, 1921

INVENTORS
STEPHEN GAVEL
EBER FROST.

BY Fetherstonhaugh & Co
ATTYS.

Patented Apr. 10, 1923.

1,450,954

UNITED STATES PATENT OFFICE.

STEPHEN GAVEL AND EBER FROST, OF OLDS, ALBERTA, CANADA.

SHOCK ABSORBER.

Application filed June 24, 1921. Serial No. 480,121.

*To all whom it may concern:*

Be it known that we, STEPHEN GAVEL and EBER FROST, both subjects of the King of Great Britain, and residents of the town of Olds, in the Province of Alberta, Dominion of Canada, have invented certain new and useful Improvements in Shock Absorbers, of which the following is a specification.

This invention relates to improvements in shock absorbers, and has for its objects to provide a means designed to coact with the springs of a vehicle and relieve the tire of some of its work by loosening the rebound and thus reduce the wear and tear of the whole mechanism of the vehicle.

Other objects are to provide a shock absorber comprising an arm pivotally carried by the vehicle axle and the spring, coacting with pneumatic means with the said spring.

Other objects are to provide pneumatic means comprising a ball of fabric holding air under high pressure and designed to absorb part of the shock before the same is transmitted to the spring.

Other objects are to provide a shock absorber which is simple in construction and not liable to go out of repair, and generally to adapt the several parts to better perform the functions required of them.

With the above and other objects in view, the invention consists essentially of the improved construction hereinafter described in detail in the following specification and accompanying drawings forming part of the same.

In the drawings.

Like characters of reference indicate corresponding parts in all the figures.

Figure 3:
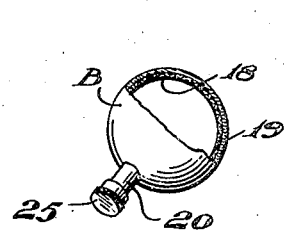
Figure 3 is a perspective view showing the pneumatic means partly in section.
Figure 2:
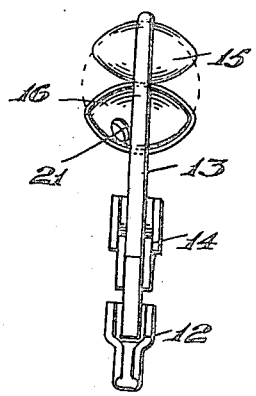
Figure 2 is an end elevation of the shock absorber.
Figure 1:
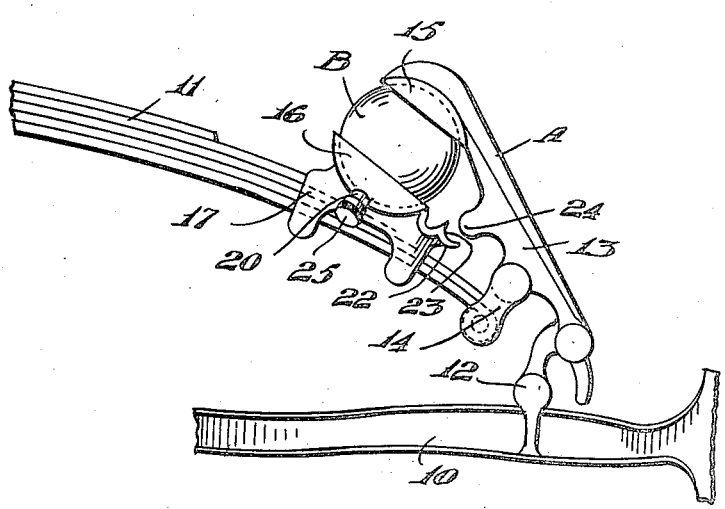
Figure 1 is a fractional front elevation of a vehicle axle and leaf spring equipped with our improved shock absorber.

Referring to the drawings, A represents the improved shock absorber, which is carried by a vehicle axle 10 and designed to coact with the leaf spring 11. The axle 10 carries a member 12 which is straddled thereon and pivotally carries an arm 13 which obliquely extends upwardly.

The arm 13 is formed with a projection 14 which is pivotally connected to the end of the spring 11. The upper free end of the arm 13 carries a cup-shaped member 15, while a similar cup-shaped member 16 is carried by a rack 17 supported by the leaf spring 11.

The two cup-shaped members 15 and 16 are designed to partly house the resilient means B. The resilient means B consist of a ball made of canvas fabric 18 coated with an outer rubber fabric 19 and formed with an air inlet valve 20, which projects from the lower cup-shaped member 16 through an orifice 21 provided therein.

The rack 17 is also provided with a projection 22 having a concave surface 23 designed to engage the spherical lug 24 carried by the underside of the arm 13. When this shock absorber is used on a vehicle, it will be seen that when the axle rebounds, the pivoted end 12 of the arm 13 will be raised and the said arm being fulcrumed at 14 to the spring 11 will bear against the pneumatic ball B, which will greatly reduce the rebound before the shock is transmitted to the leaf spring 11.

Should the shock be too heavy and the danger be incurred of breaking the ball B, it will be seen that the spherical projection 24 provided on the arm 13 will come into contact with the concave surface 23 of the rack 17 and will thus limit the pivotal movement of the arm 13.

Air can be fed to the ball 18 through the air inlet 20 extending through the orifice 21 of the cup-shaped member 16, and when the pressure in the ball B is suitable, the valve is closed by the valve cap 25.

It will be seen that by this pneumatic shock absorber a good deal of the rebound transmitted by the axle and the spring will be greatly absorbed by the ball B. Also this shock absorber will warrant the use of cheaper springs, as the resiliency being afforded by the ball B, the springs will not require to be of such a fine grade of steel, as is presently used, and thus will greatly reduce the expense heretofore afforded.

As many changes could be made in the above construction, and many apparently widely different embodiments of our invention, within the scope of the claims, constructed without departing from the spirit or scope thereof, it is intended that all matter contained in the accompanying specification and drawings shall be interpreted as illustrative and not in a limiting sense.

What we claim as our invention is:

The combination with the spring and axle of a vehicle, of a shock absorber comprising an arm pivotally mounted on the axle, a lug extending from the arm and pivotally connected to the spring, a cup formed on the free end of the arm, a cup-shaped receiving member on the spring having an orifice therein, a sphere of resilient material designed to be inflated with air engaged by the two cups, an air inlet valve on the sphere extending through the orifice, a concave extension formed on the cup-shaped receiving member, a spherical lug designed to engage with the concave extension to limit the pivotal movement of the arm, and a finger on the arm extending on the opposite side of its pivot, as and for the purpose described.

In witness whereof we have hereunto set our hands in the presence of two witnesses.

STEPHEN GAVEL.
EBER FROST.

Witnesses:
A. C. BURY,
D. BEATON.